United States Patent Office 3,450,689
Patented June 17, 1969

3,450,689
WATER-SOLUBLE DISAZO DYESTUFFS AND
THEIR COMPLEX METAL COMPOUNDS
Gerhard Langbein, Hofheim, Taunus, and Fritz Meininger, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 13, 1966, Ser. No. 556,874
Claims priority, application Germany, June 18, 1965, F 46,375
Int. Cl. C09b 29/02
U.S. Cl. 260—147                6 Claims

ABSTRACT OF THE DISCLOSURE

Water-soluble disazo-dyestuffs and copper, cobalt, chromium, nickel, and iron complex compounds thereof having the formula

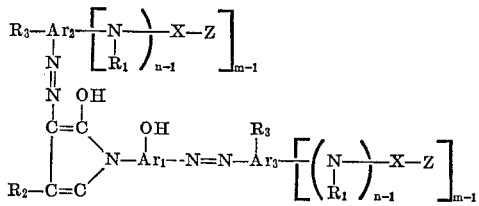

wherein $Ar_1$ is benzene or naphthalene, $Ar_2$ and $Ar_3$ are benzene, naphthalene, benzene-sulfonic acids, naphthalene-sulfonic acids, lower alkoxybenzenes, nitrobenzenes, nitrobenzene-sulfonic acids, lower alkoxy-nitrobenzene-sulfonic acids or chlorobenzene-sulfonic acids, $R_1$ is hydrogen or lower alkyl, $R_2$ is lower alkyl, phenyl, —COOH or —COO-lower alkyl, $R_3$ is hydrogen, hydroxyl, carboxyl or lower alkoxy, X is sulfonyl or carbonyl, Z is β-chloroethyl, β-sulfatoethyl, β-phosphatoethyl or vinyl, and $n$ and $m$ are integers from 1 to 2, at least one $m$ being 2, the substituents $R_3$ in $Ar_2$ and —OH in $Ar_1$ being in o-position to the adjacent azo groups.

The present invention provides new water-soluble disazo dyestuffs, their complex metal compounds and a process for preparing them; more particularly, the present invention provides a water-soluble disazo-dyestuff of the formula

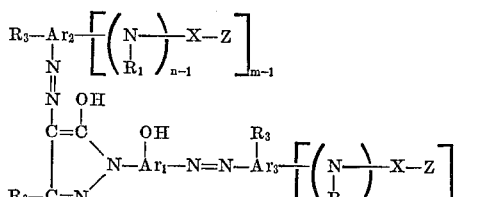

wherein $Ar_1$ represents a benzene or naphthalene radical, $Ar_2$ and $Ar_3$ represent radicals of benzene, naphthalene, benzene-sulfonic acids, naphthalene-sulfonic acids, lower alkoxybenzenes, nitrobenzenes, nitrobenzene-sulfonic acids, lower alkoxy-nitrobenzene-sulfonic acids and chlorobenzene-sulfonic acids, $R_1$ represents hydrogen or lower alkyl, $R_2$ represents lower alkyl, phenyl, —COOH or —COO-lower alkyl, $R_3$ represents hydrogen, hydroxyl, carboxyl or lower alkoxy, X represents sulfonyl or carbonyl, Z represents β-chloro-ethyl, β-sulfatoethyl, β-phosphatoethyl or vinyl, $n$ and $m$ represent integers from 1 to 2, at least one $m$ being 2, and wherein the substituents $R_3$ in $Ar_2$ and —OH in $Ar_1$ are linked in o-position to the azo group.

The above-specified water-soluble disazo dyestuffs and their complex metal compounds can be prepared by coupling, simultaneously or consecutively, 2 mols of identical or different aromatic diazo compounds of which at least one contains at least once the group

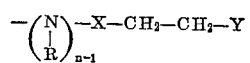     (1)

or

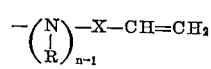     (2)

wherein R represents a hydrogen atom, an aliphatic or araliphatic radical, X represents a sulfonyl or carbonyl group, Y represents a halogen atom, a hydroxy group or the radical of a polybasic acid, for example, —O—SO$_3$H or —O—H$_2$PO$_3$, and $n$ represents the integer 1 or 2, with 1 mol of a coupling component of the general formula

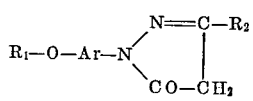

in which Ar represents a benzene or naphthalene radical containing at least 1 sulfonic acid group, $R_1$ represents a hydrogen atom or an acyl radical, and $R_2$ represents an alkyl, aryl, carboxyl or carboxylic acid ester radical, and in case coupling components are used in which $R_1$ represents an acyl radical, allowing the second mol of the diazo compound to react only after having split off the acyl radical by hydrolysis, and in those of the disazo dyestuffs obtained which contain a hydroxy group within the groups of the Formula 1, esterifying the alcoholic hydroxy group by treatment with polybasic acids, the monoamides or monochlorides thereof, and if desired, treating with metal donors the disazo dyestuffs obtained, if they contain groups that form metal complexes or groups which are convertible into groups that form metal complexes.

The disazo dyestuffs obtained according to the process of the present invention and which contain groups of the Formula 1 can be converted by treatment with aqueous alkaline agents into disazo-dyestuffs containing groups of the Formula 2; however, this treatment is carried out after esterification of the hydroxy group, if Y in the Formula 1 represents such a hydroxy group.

For preparing the new disazo dyestuffs, there may be used as diazo components, for example, 1-aminobenzene-4-β-hydroxy-ethyl-sulfone-sulfuric acid ester, 1-aminobenzene - 4 - vinylsulfone, 1 - aminobenzene - 3 - β-chloroethylsulfone, 1 - amino - 2 - hydroxy - 5 - β - hydroxyethylsulfone-sulfuric acid ester, 1-amino-2-hydroxybenzene - 5 - β - hydroxyethylsulfone, 1 - amino - 2 - hydroxy - 4 - β - hydroxyethylbenzenesulfone-sulfuric acid ester, 1 - amino - 2 - hydroxy - 5 - N - methyl - ethionyl-aminobenzene, 1 - amino - 4 - acroylaminobenzene - 2 - sulfonic acid, 1 - amino - 3 - β - chloropropionyl-amino-benzene, 1 - amino - 2 - hydroxy - 6 -nitro-naphthalene-4 - sulfonic acid, 1 - amino - naphthalene - 4 - sulfonic acid or 1 - amino - naphthalene - 5 - β - hydroxyethylsulfone-sulfuric acid ester.

For preparing disazo dyestuffs which contain only 1 reactive group of the above indicated Formula 1 or 2, there may be used as the first or second diazo component any other aromatic amines such, for example, as amino-benzene, anthranilic acid and derivatives of o-amino-phenol, naphthyl-amine or o-aminonaphthol.

As coupling components, there are suitable for example, the following compounds:

1-(8'-hydroxy-6'-sulfo-2'-naphthyl)-3-methyl-pyrazolone-(5),
1-(5'-hydroxy-7'-sulfo-1'-naphthyl)-3-methyl-pyrazolone-(5),
1-(5'-hydroxy-7'-sulfo-2'-naphthyl)-3-methyl-pyrazolone-(5),
1-(8'-hydroxy-6'-sulfo-2'-naphthyl)-3-phenyl-pyrazolone-(5),
1-(3'-hydroxy-4'-sulfo-1'-phenyl)-3-methyl-pyrazolone-(5),
1-(8'-hydroxy-6'-sulfo-2'-naphthyl)-pyrazolone-(5)-3-carboxylic acid,
1-(8'-p-toluenesulfonyloxy-6'-sulfo-2'-naphthyl)-3-methylpyrazolone-(5).

Diazo components with a low coupling energy, for example, o-aminophenol or o-aminonaphthol derivatives or 2-aminobenzoic acid, can be coupled only once with the coupling components of the above-indicated formula in which $R_1$ represents a hydrogen atom, when working in a weakly acid medium. In this case, monoazo dyestuffs can be isolated which contain the diazo component at the pyrazolone nucleus. When diazo components that have a higher coupling energy are used, for example, aniline-sulfonic acids or anilines which are substituted by other acid radicals, the preparation of the monoazo dyestuffs succeeds in many cases only when protecting by acylation, for example with p-toluene sulfochloride, the naphtholic hydroxy group and hydrolysing it after coupling. By further coupling with another diazotized amine, it is then possible, suitably in a neutral or weakly alkaline medium, to prepare disazo dyestuffs which contain two different diazo components.

If the dyestuffs contain metallizable groups such, for example, as two hydroxy or hydroxy-carboxy groups to o,o'-position to an azo group or groups which are convertible into such groups, they can be transformed in known manner into complex metal compounds. As metal donors, there may be used compounds of copper, nickel, cobalt, chromium or iron. Disazo dyestuffs with different complex bound metals can be prepared by metallization of the primarily prepared monoazo dyestuffs, further coupling to yield disazo dyestuffs and further treatment with another metal donor.

The new dyestuffs are suitable for the dyeing and printing of fibrous materials of any kind, for example, materials of native or regenerated cellulose, wool, silk or polyamide. They can be fixed onto the fibrous material in the presence of agents having an alkaline action or of agents which give off alkali upon heating, at room temperature or at an elevated temperature. The dyestuffs of the present invention are distinguished by good to very good fastness to wetting and to chlorine-containing water or to chlorine, and in many cases also by good to very good fastness to light, high tinctorial strength and a good affinity in the dyeing according to the exhausting process.

Compared to known dyestuffs of similar constitution, for example those described in German Patents 138,902 and 1,077,812, the new dyestuffs are distinguished by considerably better fastness to wetting.

The following examples illustrate the invention but they are not intended to limit it thereto, the parts indicated being by weight unless otherwise stated, the relationship of parts by weight to parts by volume being that of the kilogram to the liter.

Example 1

217 parts of 1-amino-2-hydroxybenzene-5-β-hydroxy-ethylsulfone are introduced, while stirring, at room temperature, into 570 parts of concentrated sulfuric acid and the whole is stirred until complete solution. The mixture is then poured over 1500 parts of ice and diazotized at 5–10° C. with a solution of 70 parts of sodium nitrate in 110 parts of water. After addition of 1000 parts of water and 1500 parts of ice, the mixture is neutralized by slowly adding a total of 1000 parts of sodium bicarbonate. Thereupon, the temperature is allowed to rise slowly. When it reaches 20° C., the formation of foam is terminated. Then, 170 parts of sodium salt of 1-(8'-hydroxy-6' - sulfo - 2' - naphthyl) - 3 - methyl-pyrazolone-(5) are introduced into this mixture, the pH of the mixture is brought to 9.0 by the addition of about 250 parts of anhydrous sodium carbonate and the whole is stirred for some hours at room temperature until coupling is completed. The dyestuff is then salted out by means of potassium chloride and isolated by filtration with suction.

The dyestuff, which is obtained in the form of a dark violet-brown powder, dissolves in water to give a red violet solution and has as free acid predominantly the formula

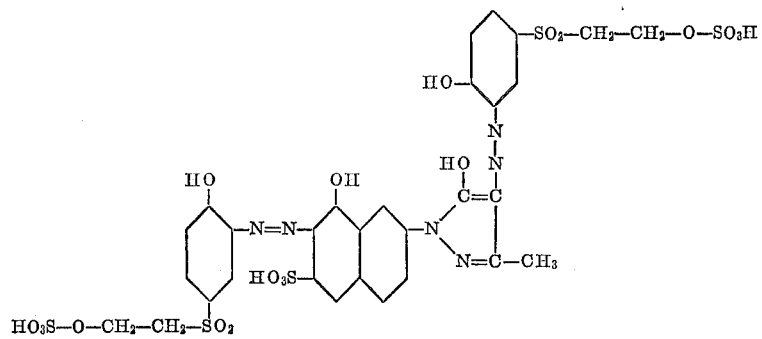

a part of the β-hydroxyethylsulfone-sulfuric acid ester groups having passed into the vinyl-sulfone group by the action of the alkali during the coupling reaction.

180 parts of dyestuff thus obtained, having a strength of about 50%, are introduced into a solution of 50 parts of crystalline copper sulfate and 110 parts of crystalline sodium acetate in 1300 parts of water and the whole is heated for 1 to 2 hours at 80° C. After cooling, the dyestuff is separated by adding sodium chloride and then isolated. It constitutes a violet brown powder which dissolves in water to give a red brown solution and which dyes cellulose fibers in the presence of agents having an alkaline action red brown shades that have very good fastness to light, to washing, to chlorine-containing water and to chlorine. The dyestuff contains 2 atoms of copper per molecule.

If for metallization there are used instead of the indicated quantity of copper sulfate, 30 parts of crystalline cobalt sulfate, a dyestuff in the form of a black brown powder is obtained which dissolves in water to give a brown solution and which gives on cotton fabric full brown prints or pad dyeings that have good fastness to light and to wet processing and mean fastness to chlorine. Even on polyamide fibers, this dyestuff gives valuable brown dyeings and prints. The dyestuff contains 1 atom of cobalt per molecule.

Example 2

189 part of 1-amino-2-hydroxybenzene-5-sulfonic acid are introduced into 3800 parts of water and 300 parts of concentrated hydrochloric acid, whereupon the mixture is diazotized, at 5–10° C., with a solution of 70 parts of sodium nitrite in 110 parts of water. The excess of sodium nitrite is destroyed by adding a small amount of amidosulfonic acid. Then, 342 parts of sodium salt of 1 - (5'-hydroxy-7'-sulfo-1'-naphthyl)-3-methylpyrazolone-(5) are introduced into the mixture thus obtained, the pH-valve of the mixture is brought to about 4.0 by the addition of sodium bicarbonate, 50 parts of crystalline sodium acetate are added and stirring is continued until coupling is complete. By adding 1000 parts of potassium chloride the yellow monoazo dyestuff of the formula

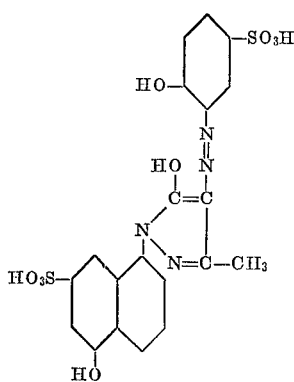

is separated, filtered off with suction and then introduced, while stirring, into 2000 parts of water. 310 parts of the inner sulfate of 1-diazo-2-hydroxybenzene-5-β-hydroxyethylsulfone-sulfuric acid ester are added, the pH-value is brought to 9.0 by the addition of about 350 parts of sodium carbonate and the whole is stirred for several hours at room temperature until coupling is complete. The dyestuff is separated by the addition of sodium chloride and filtered off with suction. It constitutes a dark brown powder which dissolves in water to give a red brown solution and which corresponds predominantly to the formula

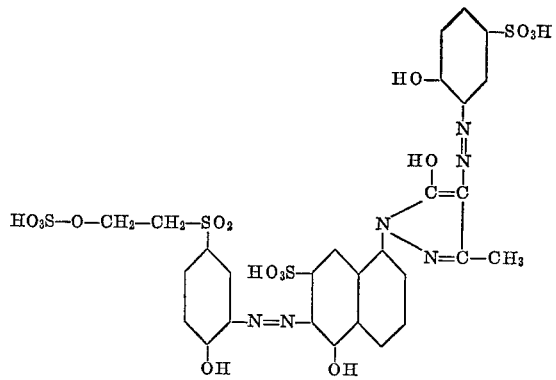

a small part thereof having the form of a vinyl-sulfone dye-stuff owing to the transformation of the β-hydroxyethylsulfone-sulfuric acid ester grouping into the corresponding vinyl-sulfone group by the action of alkali during the coupling reaction.

166 parts of the dyestuff thus obtained, having a strength of about 50%, are converted according to the method described in Example 1, into the copper complex dyestuff which contains 2 atoms of copper per molecule. It constitutes a dark brown powder which dissolves in water to give a red brown solution. In the presence of alkali, it dyes cellulose fibers from long liquors intense red brown shades which have very good fastness to wet processing and to light.

Example 3

320 parts of 1-(8'-hydroxy-6'-sulfo-2'-naphthyl)-3-methylpyrazolone-(5) are introduced into 2500 parts of water. By slowly adding a total of 53 parts of anhydrous sodium carbonate the substance is dissolved in the form of its sodium salt. 308 parts of the inner sulfate of 1-diazo-2-hydroxybenzene-5-β-hydroxyethylsulfone - sulfuric acid ester are then added, while stirring, a solution of sodium acetate having a strength of 20% by weight is then added dropwise until the mixture has a pH-value of 3.0. After further stirring for half an hour, 500 parts of potassium chloride are added and stirring is continued at room temperature until coupling is complete. From the initial solution, the monazo dyestuff of the formula

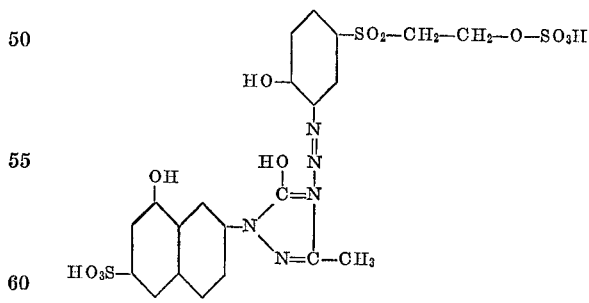

separates in the form of a yellow brown precipitate which is isolated by filtration with suction.

21 parts of 1-amino-2-methoxybenzene-5-sulfonic acid are heated in 300 parts of water and 30 parts of concentrated hydrochloric acid until they are dissolved; the whole is then cooled and diazotized, at 10° C., by the dropwise addition of 17.5 parts of a sodium nitrite solution having a strength of 17.5% by weight. This mixture is then allowed to run into a suspension of 90 parts of the above-described monoazo-dyestuff having a content of pure substance of about 70% in 500 parts of water. Thereupon, a total of 30 parts of sodium bicarbonate is slowly added until a pH of 7.0 is reached; stirring is then continued at room temperature until coupling is complete. Thereby, complete dissolution takes place. The disazo-dyestuff formed which corresponds to the formula

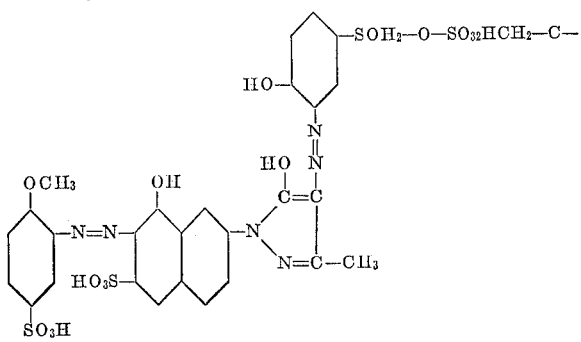

is precipitated by the addition of sodium chloride. It constitutes a dark brown powder which dissolves in water to give a red solution.

170 parts of the dyestuffs thus obtained, having a strength of about 50%, are introduced into a solution of 25 parts of crystalline copper sulfate and 55 parts of crystalline sodium acetate in 1000 parts of water and heated for 1 hour at 80° C. The dyestuff is then precipitated by means of a mixture of potassium chloride and sodium chloride and filtered off with suction. It contains 1 atom of copper per molecule and constitutes a dark brown powder which dissolves in water to give a red solution. In the presence of agents having an alkaline action it gives on cotton or polyamide fabrics red brown prints which have good fastness to light and to wet processing.

Example 4

175 parts of 1-(8'-hydroxy-6'-sulfo-2'-naphthyl)-pyrazolone-(5)-3-carboxylic acid are suspended in a mixture of 3500 parts of water and 175 parts of glacial acetic acid. Thereupon, 92 parts of the inner sulfonate of 1-diazobenzene-4-sulfonic acid are introduced and the whole is stirred at room temperature until coupling is complete; during that time complete dissolution takes place. The monoazo-dyestuff formed is separated in the form of orange coloured flocks by adding 500 parts of potassium chloride and isolated by filtration with suction.

The wet filter cake is dissolved in 3000 parts of water. A solution of diazonium salt, which has been prepared as described hereinafter, is allowed to run into this solution.

92 parts of 1-aminobenzene-4-vinyl-sulfone are dissolved in 300 parts of water and 125 parts of concentrated hydrochloric acid and diazotized at 5–10° C. with 100 parts by volume of a 5 N sodium nitrate solution.

The pH of the coupling mixture is brought to 6.5–7.0 by the addition of sodium bicarbonate and stirring of the mixture is continued until coupling is complete. The disazo dyestuff formed is separated by the addition of sodium chloride and isolated by filtration with suction. It constitutes a dark red powder which dissolves in water to give a yellow red solution and corresponds to the formula

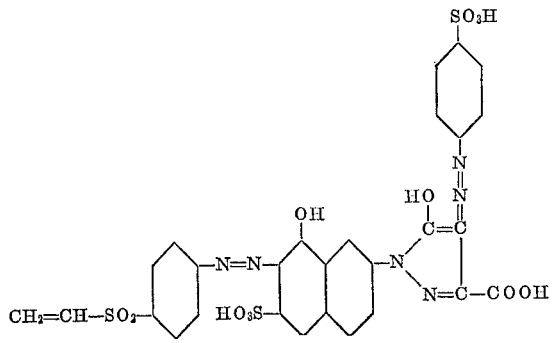

This dyestuff yields on cellulose or polyamide fibers and on wool orange brown dyeings and prints which have good fastness to wet processing and medium fastness to light.

A dyestuff having a similar shade and similar fastness properties is obtained when using for the first coupling, instead of the inner sulfonate of 1-diazobenzene-4-sulfonic acid, the corresponding amount of the inner sulfate of the 1-diazobenzene-4-β-hydroxyethylsulfone-sulfuric acid ester.

Example 5

The monoazo dyestuff prepared according to Example 4 in form of the wet filter cake is introduced into 3000 parts of water. 114 parts of the diazo-oxide of 1-amino-2-hydroxybenzene-5-β-hydroxyethylsulfone are added, the pH of the mixture is raised to 9.5–10.0 by adding anhydrous sodium carbonate and the whole is stirred at room temperature until coupling is complete. Thereupon, the mixture is neutralized by dropwise introduction of hydrochloric acid having a strength of 20% and the disazo-dyestuff is salted out by means of 600 parts of potassium chloride. The isolated dyestuff constitutes a dark brown powder which dissolves in water to give a brown red solution and corresponds to the formula

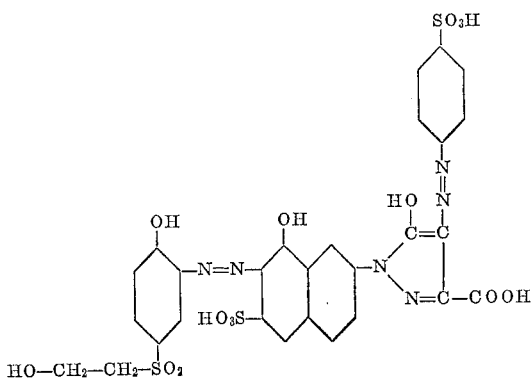

127 parts of this dyestuff, having a strength of about 60%, are slowly introduced, while stirring, into 635 parts by weight of concentrated sulfuric acid and the whole is stirred for several hours at room temperature until solution is complete. Thereupon, the mixture is poured, while stirring, on 1900 parts of ice, the esterified dyestuff is salted out by adding potassium chloride and filtered off with suction. The wet filter cake is then dissolved in 800 parts of water and neutralized with a small amount of sodium hydroxide solution, 80 parts of a sodium hydroxide solution of 16% strength are then added dropwise, at room temperature, within some minutes, and the whole is stirred for a short time. The mixture is rendered weakly acid by the dropwise addition of hydrochloric acid having 20% strength and the dyestuff is separated by the addition of potassium chloride. The isolated dyestuff constitutes a dark brown powder which dissolves in water to give a brown red solution and which corresponds to the formula

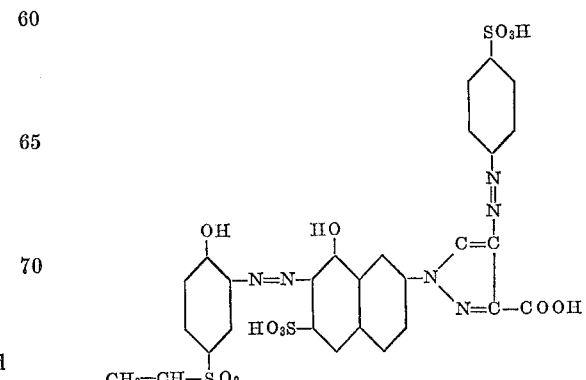

125 parts of this dyestuff, having a strength of about 60%, are introduced into a solution of 25 parts of crystalline copper sulfate and 55 parts of crystalline sodium acetate in 1000 parts of water and the whole is heated for about 1 hour at 80°. After cooling, the dyestuff is precipitated by means of sodium chloride and filtered off with suction. It constitutes a dark brown powder which dissolves in water to give a dark red solution. It contains 1 atom of copper per dyestuff molecule.

In the presence of alkali, the dyestuff gives on cellulose fibers red brown dyeings and prints which posses good fastness to wet processing and to light.

Example 6

170 parts by weight of sodium salt of 1-(5'-hydroxy-7'-sulfo-2'-naphthyl)-3-methyl-pyrazolone-(5) are dissolved in 2000 parts of water; thereafter, 230 parts of the diazo-oxide of 1-amino-2-hydroxybenzene-5-β-hydroxyethyl-sulfone are added, while stirring. By dropwise adding a sodium hydroxide solution of 38° Bé., the pH-value of the mixture is brought to 12.0 and the whole is stirred for several hours at room temperature until coupling is complete. The mixture is then rendered weakly acid to Congo paper by dropwise adding hydrochloric acid having a strength of 20% and stirred until it becomes thinly liquid. It is then filtered off with suction, washed with a small amount of dilute hydrochloric acid and dried. In this form, the dyestuff is only sparingly soluble in water. Upon addition of alkali, it dissolves to give a red brown solution and corresponds to the formula

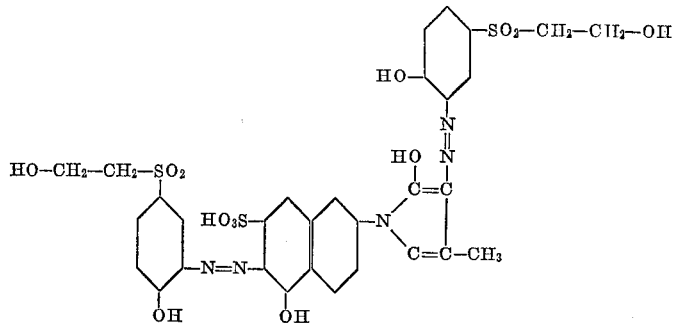

200 parts of this dyestuff are slowly introduced, while stirring, into 1000 parts of concentrated sulfuric acid. The whole is stirred for several hours at 25–30° C. until solution is complete. The mixture is then poured, while stirring, on 3000 parts of ice and the dyestuff is salted out by the addition of potassium chloride. After filtration with suction, the still strongly acid filter cake is eluted with a saturated sodium chloride solution, adjusted to the neutral point by cautious addition of sodium bicarbonate and then again filtered with suction.

The dyestuff, which is now in the form of the di-(β-hydroxy-ethylsulfone-sulfuric acid ester), can be transformed as described in Example 1 into the copper complex compound (with 2 copper atoms per molecule) and constitutes as such a dark brown powder which dissolves in water to give a dark red solution and gives on cotton or staple fibers red brown dyeings having good fastness to light and to wet processing.

Example 7

342 parts of the sodium salt of 1-(8'-hydroxy-6'-sulfo-2'-naphthyl)-3-methyl-pyrazolone-(5) are dissolved in 4000 parts of water, whereupon 150 parts of glacial acetic acid are added. Then, 228 parts of the diazo-oxide of 1-amino-2-hydroxybenzene-5-β-hydroxyethylsulfone are introduced, while stirring, and the whole is stirred for several hours at room temperature until coupling is complete. The monoazo-dyestuff which is obtained in the form of a yellow brown precipitate is filtered off with suction, washed with a sodium chloride solution having a strength of 10% and dried. It corresponds to the formula

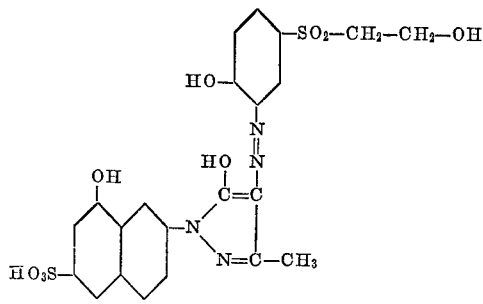

80 parts of the dyestuff, having a strength of about 70%, are introduced into 300 parts of anhydrous pyridine and, after addition of 5 parts of urea, the whole is heated at 85° C. At this temperature, 35 parts of amido-sulfonic acid are portion-wise added and the whole is heated for about 1 hour at 100–105° C. After cooling, the mixture is poured into 2500 parts of water, rendered weakly acid to Congo paper by the addition of hydrochloric acid having a strength of 20%, the precipitation of the dyestuff is completed by the addition of 200 parts of sodium chloride and the dyestuff is filtered off with suction.

The sulfuric acid ester of the monoazo-dyestuff, obtained in the form of an orange yellow powder, is identical with the monoazo-dyestuff described in Example 3. By further coupling according to Example 3 with any desired diazotized aromatic amines, further disazo-dyestuffs may be obtained. The esterification in pyridine can be carried out in the same manner with the aid of chlorosulfonic acid at 30–40° C.

Example 8

100 parts of the monoazo-dyestuff, having a strength of about 60% and described in Example 3, are introduced into a solution of 25 parts of crystalline copper sulfate and 55 parts of crystalline sodium acetate in 800 parts of water, and the whole is stirred for 1 hour at 80° C. After cooling, the copper complex dyestuff that has formed is salted out with sodium chloride, filtered off with suction and washed with a saturated sodium chloride solution. The wet dyestuff paste is then introduced into 500 parts of water. 31 parts of the inner sulfate of 1-amino - 2 - hydroxy - 5 - β-hydroxyethylsulfone-sulfuric acid ester are added, the pH-value is brought to 7.5–8.0 by the addition of sodium bicarbonate and the whole is stirred at 35° C. until coupling is complete. The dyestuff is precipitated by means of sodium chloride and filtered off; it constitutes a dark brown powder which dissolves in water to give a red brown solution and corresponds to the formula

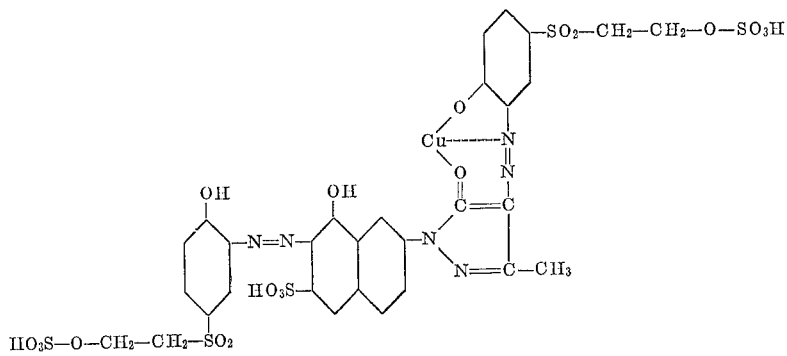

100 parts of this dyestuff, having a strength of about 50%, are stirred for 1 hour at 80° C., in 500 parts of water with 6.5 parts of cobalt acetate. The dyestuff which precipitates after cooling is filtered off with suction. It constitutes a dark brown powder which dissolves in water to give a red brown solution and which gives on cotton or staple fiber fabrics full brown prints and dyeings that have good fastness to wet processing and to light. The dyestuff contains 2 atoms of copper and 1 atom of cobalt per 2 molecules.

Example 9

320 parts of 1-(8'-hydroxy-6'-sulfo-2'-naphthyl)-3-methyl-pyrazolone-(5) are dissolved in 3000 parts of water by the dropwise addition of a 20% sodium carbonate solution up to the neutral point. 644 parts of the inner sulfate of 1-diazo-2-methoxybenzene-5-$\beta$-hydroxyethyl-sulfone-sulfuric acid ester are introduced, while stirring, the pH-valve of the mixture is brought to 6.5–7.0 by means of sodium bicarbonate and stirring is continued until coupling is complete. The dyestuff is precipitated by means of potassium chloride and constitutes a dark red powder which dissolves in water to give a yellow red solution. It gives on wool, in the presence of agents having an alkaline action, brick red dyeings that have good fastness to wet processing. The dyestuff has the formula

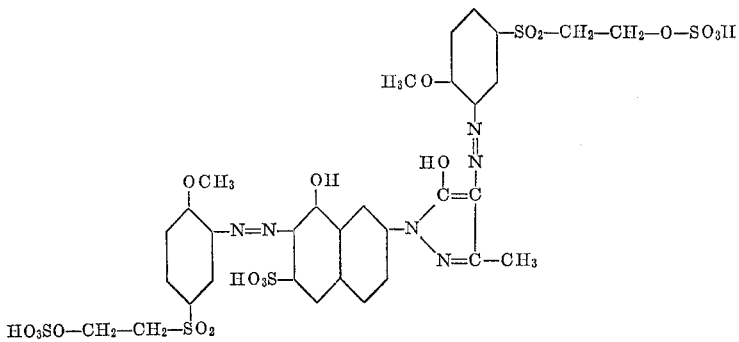

160 parts of the dyestuff, having a strength of about 60%, are heated to the boil for about 20 hours in 1000 parts of water with 60 parts of crystalline copper sulfate, 70 parts of crystalline sodium acetate and 30 parts of glacial acetic acid. After cooling, the dyestuff is salted out with potassium chloride and filtered off with suction. The complex metal dyestuff that has formed contains 2 atoms of copper per molecule and has the same properties and the same formula as the copper complex compound described in Example 1.

Example 10

189 parts of 1-amino-2-hydroxybenzene-5-sulfonic acid are diazotized as described in Example 2. 320 parts of 1-(8'-hydroxy-6'-sulfo-2'-naphthyl)-3-methyl-pyrazolone-(5) are introduced into this mixture, the pH-value of the mixture is brought to 4.0 by slowly adding sodium bicarbonate, 80 parts of crystalline sodium acetate are added and the whole is stirred at room temperature until coupling is complete. The monoazo-dyestuff formed partly separates in the form of an orange coloured precipitate. By the addition of potassium chloride the precipitation is completed. The dyestuff is filtered off with suction and introduced as wet filter cake into 2000 parts of water. 300 parts of the inner sulfate of 1-diazobenzene-4-$\beta$-hydroxyethylsulfone-sulfuric acid ester are added thereto, the pH is brought to 6.0–6.5 by addition of sodium bicarbonate and the whole is stirred at room temperature until the second coupling is completed. By the addition of potassium chloride the disazo-dyestuff formed is separated and filtered off with suction. It constitutes a red brown powder which dissolves in water to give an orange brown solution and has the formula

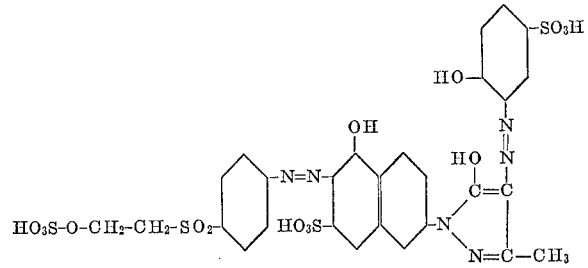

163 parts of this dyestuff, having a strength of about 50%, are introduced into a solution of 48 parts of copper acetate in 1000 parts of water. As soon as the components are dissolved, the pH-value of the mixture is brought to 5.5–6.0 by the addition of a small amount of anhydrous sodium bicarbonate, 40 parts by weight of hydrogen peroxide having a strength of 15% are added dropwise, at 20–25° C., within about 2 hours, and the whole is stirred for some time at room temperature. The dyestuff is separated by means of potassium chloride and then isolated; it constitutes a grey brown powder which dissolves in water to give a red brown solution and corresponds to the formula

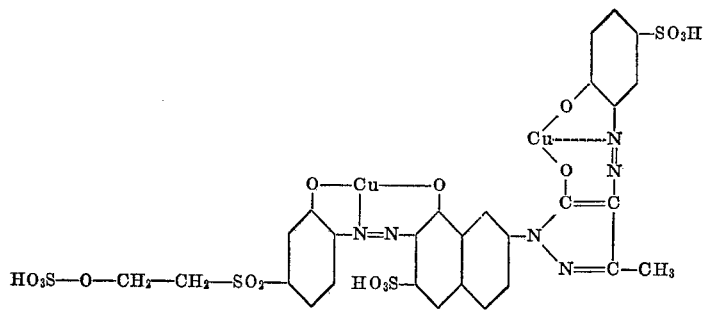

In the presence of agents having an alkaline action, the dyestuff gives on cotton or staple fibers red brown dyeings and prints that have good fastness to light, to wet processing and to chlorine.

Example 11

496 parts of sodium salt of 1-(8'-p-toluene-sulfonylhydroxy - 6'-sulfo-2'-naphthyl)-3-methyl-pyrazolone-(5) are dissolved in 2500 parts of water. 184 parts of the inner sulfonate of 1-diazobenzene-4-sulfonic acid are introduced, while stirring, into this solution, 100 parts of anhydrous sodium acetate are added and the whole is stirred until coupling is complete. The monoazo-dyestuff precipitates from the yellow solution in the form of an orange coloured precipitate upon addition of a small amount of potassium chloride. The dyestuff is isolated by filtration with suction, the wet filter cake is dissolved in 5000 parts of water, 500 parts by volume of a sodium hydroxide solution of 38° Bé. are added and the whole is heated for a short time at 90° C., whereby the p-toluenesulfonyloxy group is hydrolysed. After cooling, the mixture is neutralized by means of concentrated hydrochloric acid, 310 parts of the inner sulfate of 1-diazo-2-hydroxybenzene-5-β-hydroxyethylsulfone-sulfuric acid ester are added, while stirring, the pH-value of the mixure is brought to 8.5-9.0 by the addition of a small amount of anhydrous sodium carbonate and the whole is stirred at room temperature until the second coupling is complete. The mixture is then rendered weakly acid by dropwise addition of hydrochloric acid having a strength of 20%. The disazo dyestuff that has formed is precipitated by means of sodium chloride and filtered off with suction. It constitutes a dark red powder which dissolves in water to give a red solution. Upon addition of alkali the solution turns red violet. The dyestuff has the formula

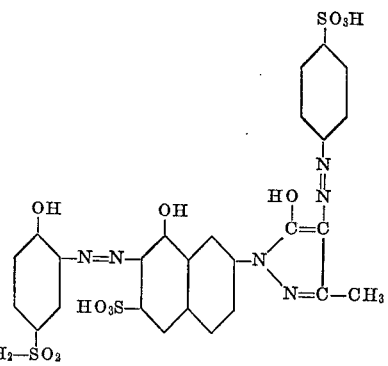

170 parts of dyestuff, having a strength of about 50%, are introduced into a solution of 25 parts of crystalline copper sulfate and 55 parts of crystalline sodium acetate in 1000 parts of water, and the whole is heated for about 1 hour at 80° C. After cooling, the dyestuff is precipitated by means of potassium chloride and filtered off with suction. It constitutes a dark brown powder which dissolves in water to give a dark red solution and which gives on cellulose fibers bordeaux-coloured dyeings and prints that have good fastness to wet processing and to light.

Example 12

312 parts of 1 - amino-2-hydroxy-5-(N-ethionyl-N-methyl-amino)-benzene are diazotized, at 5–10° C., in 2000 parts of water and 250 parts of concentrated hydrochloric acid by the dropwise addition of a solution of 70 parts of sodium nitrite in 110 parts of water. 170 parts of sodium salt of 1-(8'-hydroxy-6'-sulfo-2'-napthyl)-3-methylpyrazolone-(5) are introduced into this mixture, the pH-value of the mixture is brought to 8.0 by the addition of sodium bicarbonate and the whole is stirred for several hours at room temperature until coupling is complete. The dyestuff is precipitated by the addition of potassium chloride and then isolated; it constitutes a dark brown powder which dissolves in water to give a brown solution and corresponds in the form of the free acid to the formula

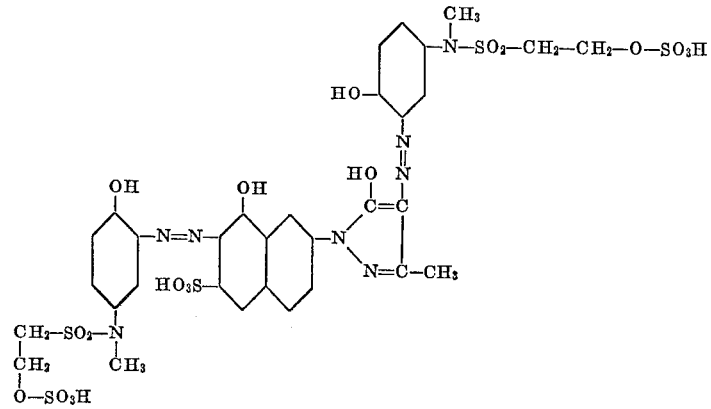

15

The copper complex dyestuff prepared from this dyestuff in the manner described in Example 1 contains 2 atoms of copper per molecule. It is a dark brown powder which dissolves in water to give a red brown solution and gives on cotton or staple fibers, in the presence of agents having an alkaline action, red brown dyeings and prints that have good fastness to washing, to chlorine and to light.

The corresponding cobalt complex dyestuff, which contains 1 atom of cobalt per molecule, gives on cotton or staple fibers neutral brown prints.

Example 13

160 parts of 1-(5'-hydroxy-7'-sulfo-1'-naphthyl)-3-methyl-pyrazolone-(5) are suspended in 2500 parts by volume of water. 295 parts of the inner sulfonate of 4-(β-chloroproprionylamino)-1-diazo-benzene-2-sulfonic acid are introduced into this suspension, while stirring, the pH-value of the mixture is adjusted to the neutral point by the addition of sodium bicarbonate, whereupon complete solution takes place; stirring is then continued until coupling is complete. The dyestuff is separated by the addition of sodium chloride and separated by filtration with suction. It constitutes a dark red powder which corresponds to the formula

16

176 parts of the dyestuff, having a strength of about 50%, are introduced into a solution of 25 parts of crystalline copper sulfate and 55 parts of crystalline sodium acetate in 1500 parts of water and the whole is heated for 1 to 2 hours at 80° C. After cooling, the dyestuff is salted out by the addition of sodium chloride. The dyestuff, which contains 1 atom of copper per molecule, constitutes a dark brown powder which dissolves in water to give a yellow brown solution and gives on cotton or staple fibers brown shades that have good fastness to washing and to light.

Example 15

600 parts of the inner sulfate of 1-diazo-benzene-4-β-hydroxyethylsulfone-sulfuric acid ester are introduced into a suspension of 270 parts of 1-(3'-hydroxy-4'-sulfo-1'-phenyl)-3-methylpyrazolone-(5) in 3600 parts of water. The pH-value of the mixture is brought to 7.5–8.0, while stirring, by adding a small amount of sodium bicarbonate and the whole is stirred until coupling is complete. The diazo dyestuff that has formed is precipitated by the addition of potassium chloride and isolated by filtration with suction. It constitutes a dark brown powder which dissolves in water to give a yellow brown solution and corresponds to the formula

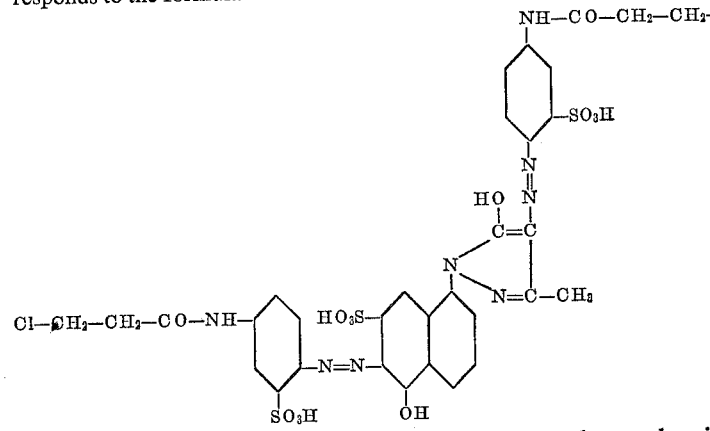

The dyestuff dissolves in water to give a yellow red solution and gives on cellulose fabrics red brown prints and pad dyeings that have very good fastness to wet processing.

Example 14

63 parts of the monoazo-dyestuff, obtainable according to Example 3 or Example 7, and 26 parts of the inner sulfonate of 5-acroylamino-1-diazobenzene-2-sulfonic acid are introduced, while stirring into 600 parts of water. The pH-value of the mixture is kept at 7.0 to 7.5 by the addition of a small amount of sodium bicarbonate, whereupon complete solution takes place. Stirring is continued until coupling is completed, the disazo dyestuff that has formed is precipitated by the addition of sodium chloride and filtered off with suction. The dyestuff constitutes a dark brown powder which dissolves in water to give a red brown solution and corresponds to the formula

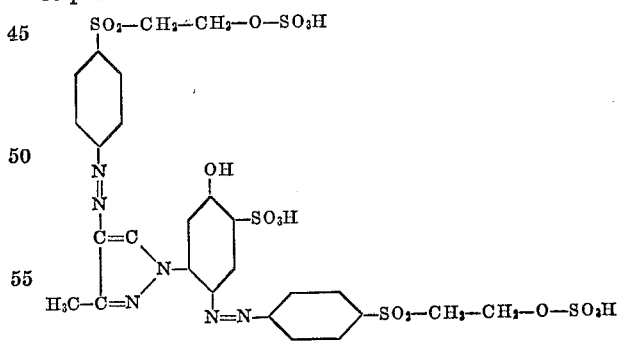

The dyestuff gives on cellulose or polyamide fibers yellow brown dyeings or prints that have good fastness to wet processing.

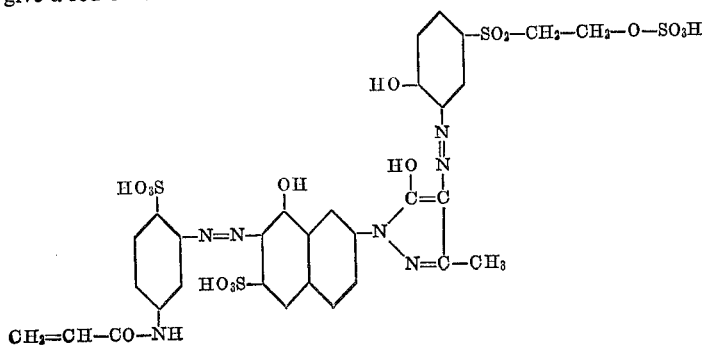

The dyestuffs listed in the following tables can be prepared in a manner similar to that described in the foregoing examples. They likewise give on cellulosic material, wool, silk or polyamide fibers dyeings and prints that have similar good properties of fastness.

| Diazo Components | | | | |
|---|---|---|---|---|
| I. At the pyrazolone side of the azo component | II. At the naphthol side of the azo component | Coupling Component | Metal | Shade |
| 1-amino-2-hydroxybenzene-5-β-hydroxyethylsulfone-sulfuric acid ester. | 1-amino-2-hydroxybenzene-5-β-hydroxyethylsulfone-sulfuric acid ester. | 1-(8'-hydroxy-6'-sulfo-2'-naphthyl)-3-methyl-pyrazolone-(5). | Cr | Violet brown. |
| Do | do | do | Ni | Brown. |
| Do | do | do | Fe | Olive brown. |
| 1-amino-2-hydroxybenzene-5-sulfonic acid. | do | do | Cu | Red brown. |
| Do | do | 1-(8'-hydroxy-6'-sulfo-2'-naphthal)-3-methyl-pyrazolone-(5). | Co | Neutral brown. |
| Do | 1-aminobenzene-3-β-chloroethylsulfone. | 1-(8'-hydroxy-6'-sulfo-2'-naphthyl)-3-methylpyrazolone-(5). | Cu | Red brown. |
| 1-amino-2-hydroxybenzene-5-β-hydroxyethylsulfone-sulfuric acid ester. | 1-aminobenzene-4-sulfonic acid | do | Cu | Do. |
| Do | 1-amino-2-hydroxybenzene-5-sulfonic acid. | do | Cu | Do. |
| Do | do | do | Co | Neutral brown. |
| Do | 1-aminonaphthaline-2-sulfonic acid | do | Cu | Red brown. |
| 1-amino-2-hydroxybenzene-4-β-hydroxyethylsulfone-sulfuric acid ester. | 1-amino-2-hydroxybenzene-4-β-hydroxyethylsulfone-sulfuric acid ester. | do | Cu | Violetish brown. |
| Do | do | do | Co | Brown. |
| Do | do | do | Cr | Currant. |
| 1-amino-2-hydroxybenzene-4-sulfonic acid. | do | do | Cu | Violetish red brown. |
| Do | do | do | Co | Brown. |
| 1-aminobenzene-4-β-hydroxyethylsulfone-sulfuric acid ester. | 1-aminobenzene-4-β-hydroxyethylsulfone-sulfuric acid ester. | do | | Orange brown. |
| 1-aminobenzene-2-carboxylic acid-5-β-hydroxyethyl-sulfone-sulfuric acid ester. | 1-aminobenzene-2-carboxylic acid-5-β-hydroxyethyl-sulfone-sulfuric acid ester. | do | Cu | Red brown. |
| Do | do | do | Co | Yellow brown. |
| Do | do | do | Cr | Neutral brown. |
| 1-amino-2-nitrobenzene-4-sulfonic acid | 1-amino-2-hydroxybenzene-5-β-hydroxyethylsulfone-sulfuric acid ester. | do | Cu | Bordeaux. |
| 1-amino-2-hydroxy-6-nitro-naphthalene-4-sulfonic acid. | do | do | Cu | Dull red. |
| Do | do | do | Co | Red brown. |
| Do | do | do | Cr | Violet brown. |
| 1-aminonaphthalene-4-sulfonic acid | do | 1-(8'-hydroxy-6'-sulfo-2'-naphthyl)-pyrazolone-(5)-3-carboxylic acid. | Cu | Red brown. |
| Do | do | do | Co | Brown. |
| 1-aminobenzene-4-sulfonic acid | 1-aminonaphthalene-5-β-hydroxyethylsulfone-sulfuric acid ester. | do | | Brown red. |
| 1-amino-2-hydroxybenzene-5-β-hydroxyethylsulfone-sulfuric acid ester. | 1-amino-2-hydroxybenzene-5-β-hydroxyethylsulfone-sulfuric acid ester. | 1-(8'-hydroxy-6'-sulfo-2'-naphthyl)-3-phenyl-pyrazolone-(5). | Cu | Red brown. |
| Do | do | do | Co | Neutral brown. |
| 1-aminobenzene-4-β-hydroxyethylsulfone-sulfuric acid ester. | do | 1-(8'-hydroxy-6'-sulfo-2'-naphthyl)-pyrazolone-(5)-3-carboxylic acid ethyl ester. | Cu | Red brown. |
| Do | do | do | Co | Neutral brown. |
| 1-amino-2-hydroxybenzene-5-sulfonic acid. | 1-amino-2-hydroxybenzene-5-β-hydroxyethylsulfone-phosphoric acid ester. | 1-(5'-hydroxy-7'-sulfo-2'-naphthyl)-3-methylpryazolone-(5). | Cu | Red brown. |
| Do | do | do | Co | Do. |
| 1-aminobenzene-2-carboxylic acid | 1-amino-2-hydroxybenzene-5-β-hydroxyethylsulfone-sulfuric acid ester. | do | Cu | Do. |
| Do | do | do | Co | Violetish brown. |
| Do | do | do | Cr | Do. |
| 1-amino-2-hydroxybenzene-5-sulfonic acid. | do | 1-(5'-hydroxy-7'-sulfo-1'-naphthyl)-3-methyl-pyrazolone-(5). | Co | Neutral brown. |
| Do | 1-aminobenzene-4-β-hydroxyethylsulfone-sulfuric acid ester. | do | Co | Brown. |

| Diazo Components | | | | |
|---|---|---|---|---|
| I. At the pyrazolone side of the azo component | II. At the naphthol side of the azo component | Coupling Component | Metal | Shade |
| 1-aminobenzene-3-β-hydroxyethylsulfone-sulfuric acid ester. | 1-aminobenzene-3-β-hydroxyethylsulfone-sulfuric acid ester. | ...do... | | Orange brown. |
| 1-amino-2-hydroxybenzene-5-sulfonic acid. | 1-amino-4-(N-methyl-N-ethionyl)-aminobenzene. | 1-(8'-hydroxy-6'-sulfo-2'-naphthyl)-3-methyl-pyrazolone-(5). | Cu | Red brown. |
| Do | 1-amino-4-(N-methyl-N-vinylsulfonyl)-amino-benzene. | ...do... | Cu | Do. |
| Do | 1-amino-4-acroylamino-benzene | ...do... | Cu | Do. |
| Do | 1-amino-2-methoxy-x-β-chloropropionylbenzene (obtained by the reaction of 1-amino-2-methoxybenzene with β-chloropropionylchloride according to Friedel Crafts). | ...do... | Cu | Do. |
| Do | 1-amino-4-β-hydroxypropionyl-amino-benzene-sulfuric acid ester. | ...do... | Cu | Do. |
| 1-amino-4-(N-methyl-N-β-chloroethyl-sulfonyl)-aminobenzene. | 1-amino-4-(N-methyl-N-β-chloroethyl-sulfonyl)-aminobenzene. | ...do... | | Dark red. |
| 1-amino-2-hydroxybenzene-5-β-hydroxyethylsulfone-sulfuric acid ester. | 1-aminobenzene-4-β-hydroxyethylsulfone-sulfuric acid ester. | 1-(3'hydroxy-4'-sulfo-1'-phenyl)-3-methyl-pyrazolone-(5). | Cu | Brown. |
| Do | ...do... | ...do... | Co | Do. |
| 1-aminobenzene-4-sulfonic acid | ...do... | ...do... | | Yellow brown. |

We claim:
1. A water-soluble disazo dyestuff of the formula

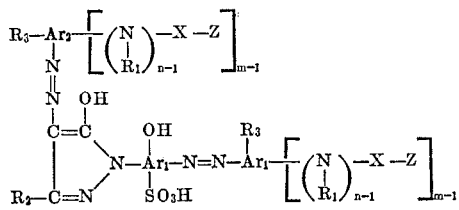

wherein $Ar_1$ is benzene or naphthalene, $Ar_2$ and $Ar_3$ each is benzene, naphthalene, mono-sulfo benzene, mono-sulfo naphthalene, mono-lower alkoxybenzene, mono-nitrobenzene, mono-sulfo-mono-nitrobenzene, mono-lower alkoxy-mono-nitrobenzene or mono-sulfo-mono-chlorobenzene, $R_1$ is hydrogen or lower alkyl, $R_2$ is lower alkyl, phenyl, —COOH or —COO-lower alkyl, $R_3$ is hydrogen, hydroxyl, carboxyl or lower alkoxy, X is sulfonyl or carbonyl, Z is β-chloro-ethyl, β-sulfatoethyl, β-phosphatoethyl or vinyl, and $n$ and $m$ are integers from 1 to 2, at least one $m$ being 2, the substituents —$R_3$ in $Ar_2$ and —OH in $Ar_1$ being in o-position to the adjacent azo groups, or the copper, nickel, cobalt, chromium or iron complex compound of said disazo dyestuff, said complex compound having a molar ratio of metal to dyestuff of 1:1 or 2:1.

2. The innermolecular 2:1 copper complex compound of the disazo-dyestuff of the formula

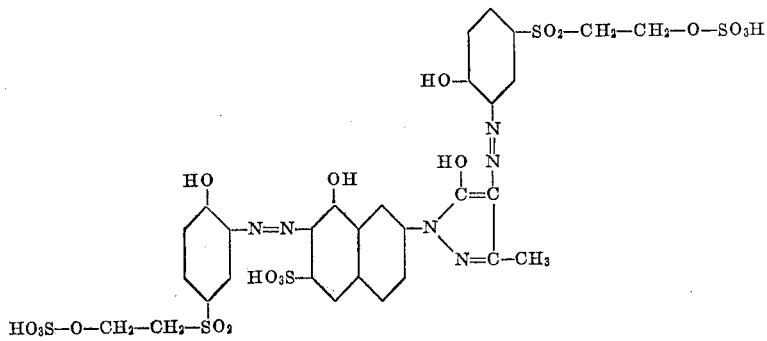

3. The innermolecular 2:1-cobalt complex compound of the disazo-dyestuff of the formula

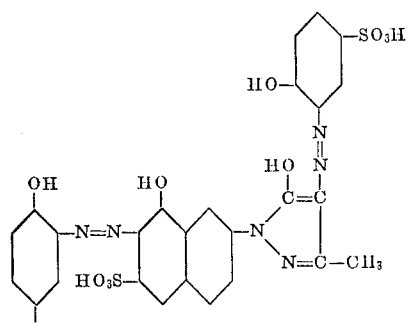

4. The innermolecular 1:1 copper complex compound of the disazo-dyestuff of the formula

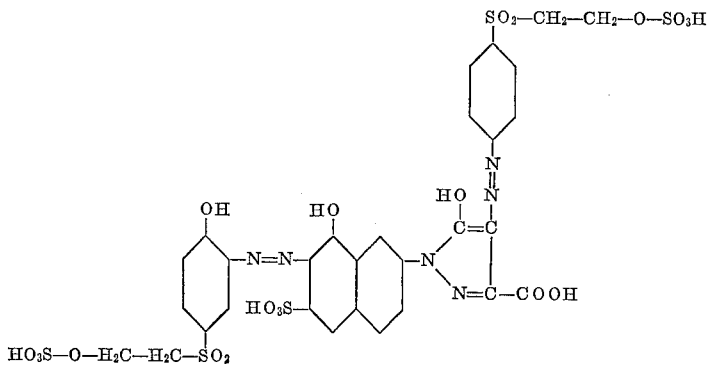

5. The innermolecular 2:1 copper complex compound of the disazo-dyestuff of the formula

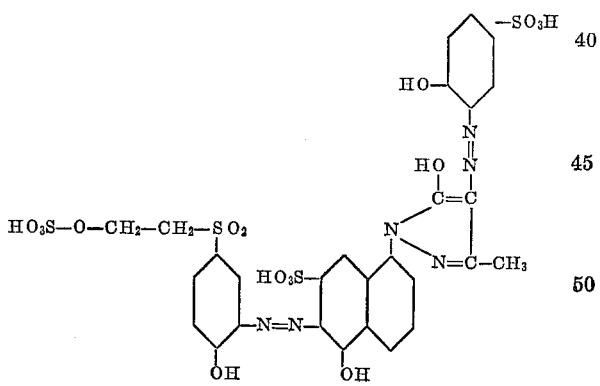

6. The innermolecular 2:1 copper complex compound of the disazo-dyestuff of the formula

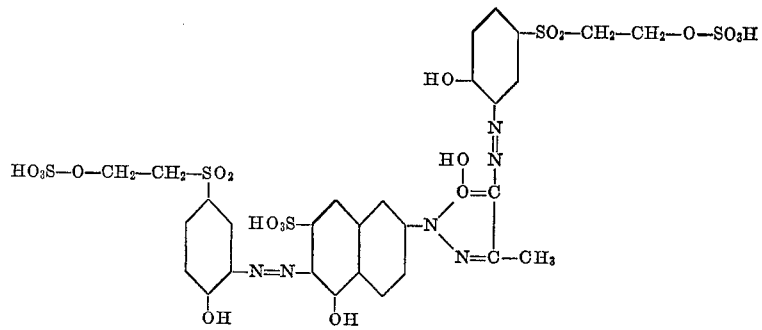

References Cited

UNITED STATES PATENTS 3,313,799   4/1967   Noll _____ 260—160

CHARLES B. PARKER, *Primary Examiner.*
DONALD M. PAPUGA, *Assistant Examiner.*

U.S. Cl. X.R.

260—160, 310, 37, 163, 458; 8—41, 42, 51, 54